United States Patent [19]
Berberich

[11] Patent Number: 5,864,448
[45] Date of Patent: Jan. 26, 1999

[54] SLIDER AND SUSPENSION RETENTION AND RETRACTION SYSTEM FOR HIGH CAPACITY DISK DRIVE

[75] Inventor: James William Berberich, San Jose, Calif.

[73] Assignee: International Business Machines Corporation, Armonk, N.Y.

[21] Appl. No.: 794,254

[22] Filed: Jan. 31, 1997

Related U.S. Application Data

[63] Continuation of Ser. No. 547,184, Oct. 24, 1995, abandoned.

[51] Int. Cl.[6] ............................. G11B 5/54; G11B 21/22
[52] U.S. Cl. ............................................. 360/105
[58] Field of Search ..................... 360/105, 103, 360/98.01, 104, 97.01

[56] References Cited

U.S. PATENT DOCUMENTS

| | | | |
|---|---|---|---|
| 4,933,785 | 6/1990 | Morehouse et al. | 360/78.04 |
| 5,023,737 | 6/1991 | Yaeger | 360/105 |
| 5,208,712 | 5/1993 | Hatch et al. | 360/105 X |
| 5,231,549 | 7/1993 | Morehouse et al. | 360/75 |
| 5,237,472 | 8/1993 | Morehouse et al. | 360/105 |
| 5,289,325 | 2/1994 | Morehouse et al. | 360/105 |

FOREIGN PATENT DOCUMENTS 58-169377  10/1983  Japan.

OTHER PUBLICATIONS

"Disk Head Load/Unload Mechanism", IBM Technical Disclosure Bulletin, vol. 30, No. 7, Dec. 1987, pp. 386–387.

*Primary Examiner*—William J. Klimowicz
*Attorney, Agent, or Firm*—Gray Cary Ware Freidenrich

[57] ABSTRACT

A retention and retraction device for a slider and suspension in a magnetic disk drive. A cam actuation device is placed at the outer periphery of each disk in a disk drive having a multi-disk stack. A cam surface attached to a load beam that is part of the suspension engages the finger when the actuator arm is rotated far enough toward the outer periphery. The finger displaces the cam and attached suspension. In turn, a slider attached to the suspension is moved away from a disk surface over which it had been engaged in a flying relationship.

16 Claims, 9 Drawing Sheets

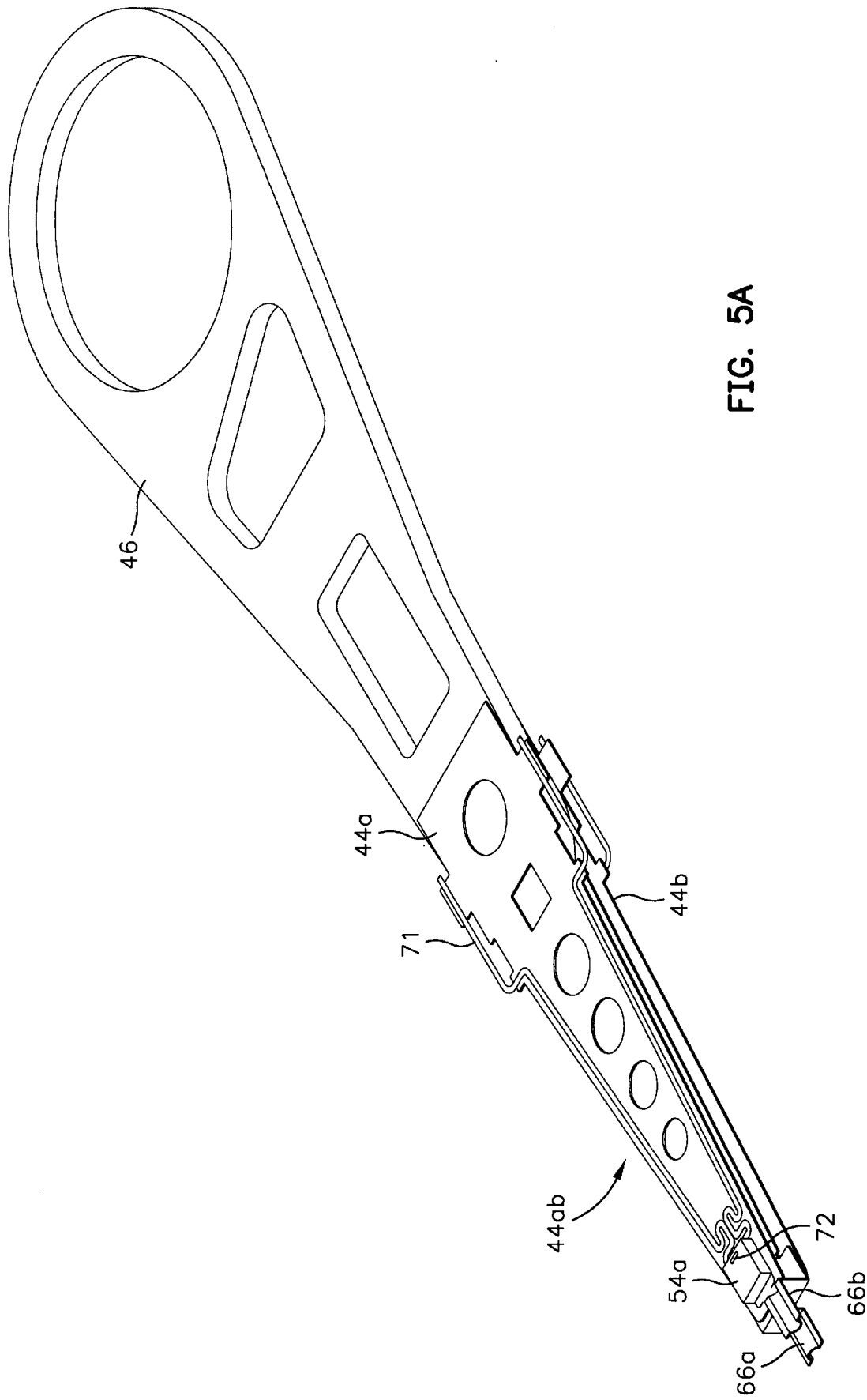

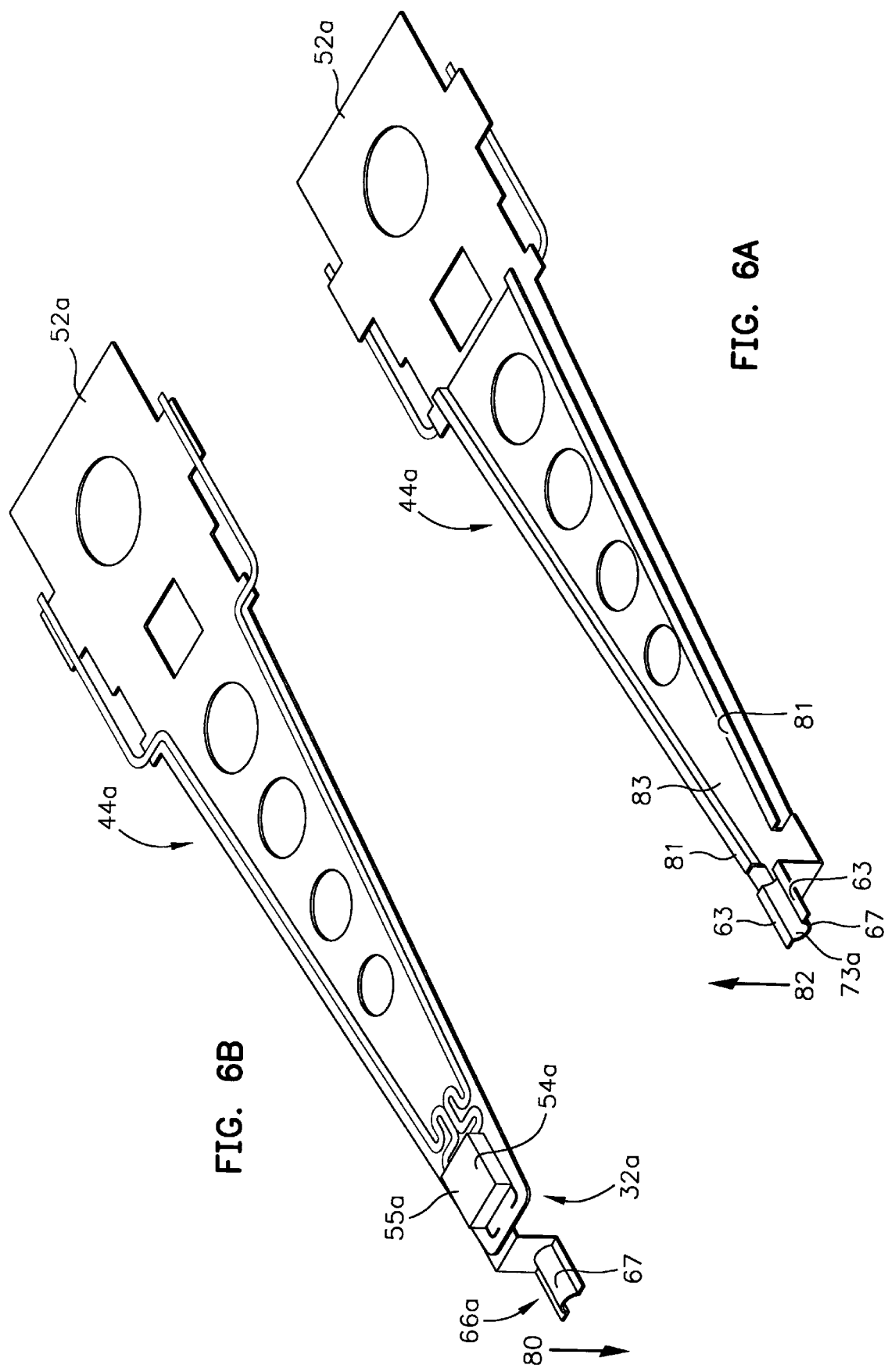

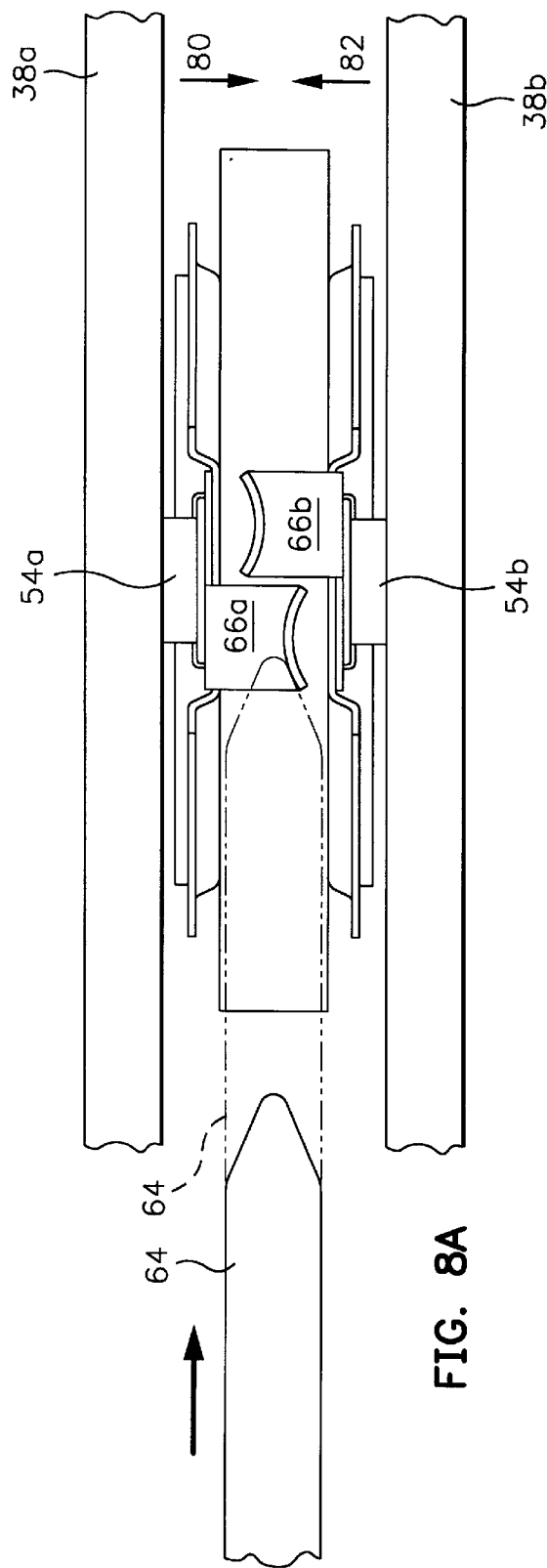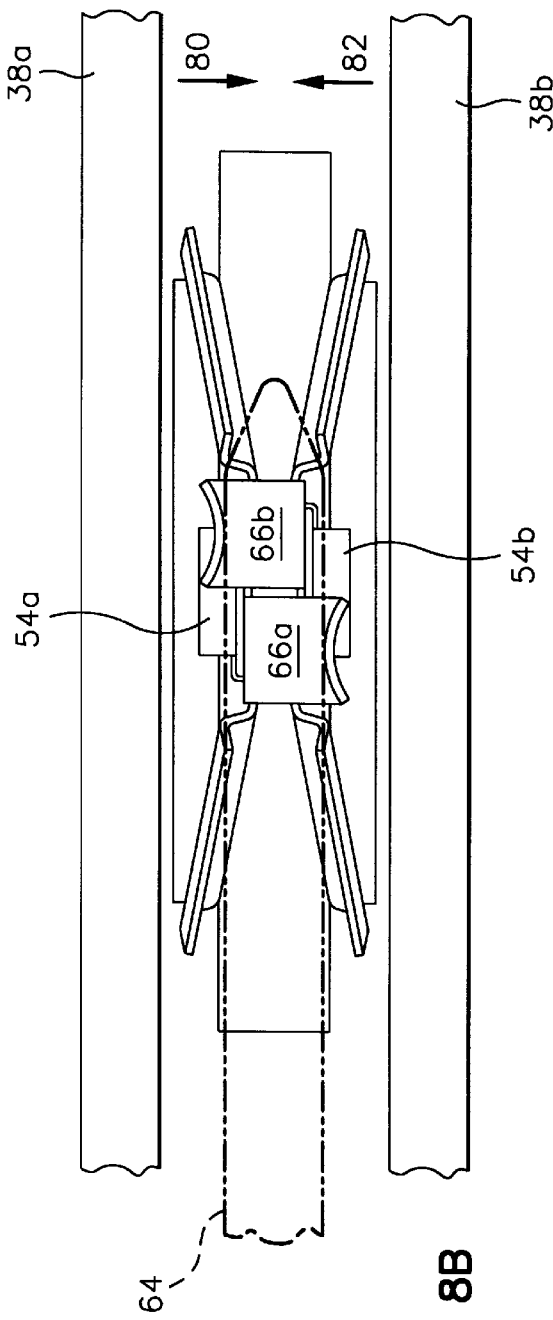

SLIDER AND SUSPENSION RETENTION AND RETRACTION SYSTEM FOR HIGH CAPACITY DISK DRIVE

This application is a continuation of application Ser. No. 08/547184, filed Oct. 24, 1995, now abandoned.

BACKGROUND OF THE INVENTION

1. Field of the Invention

This invention relates generally to computer data storage drives and more specifically to a slider suspension and a corresponding retention and retraction system configured to eliminate slider/disk stiction in densely packed data storage drives.

2. Description of the Related Art

Suspension systems are employed in magnetic disk drives. A suspension system includes a head/gimbal assembly (HGA) which is either connected to an outer end ("suspended" end) of a load beam or is integral with the load beam itself and forms part of the outer end of the load beam. The HGA includes a flexure having a window bounded in part by a pair of flexure legs and an outer terminal end portion. Extending inward from the outer terminal end portion is a flexure tongue which is cantilevered into the window. A slider, carrying a magnetic head, is mounted at its bottom to a top of the tongue. A top surface of the slider and a pole tip portion of the magnetic head form an air bearing surface (ABS). An inner end of the load beam is connected to an actuator arm for moving the ABS across a surface of a magnetic disk while a spring force of the load beam preloads the ABS of the slider toward the magnetic disk.

When the disk is rotated, the ABS of the slider is supported ("flies") a slight distance from the surface of the disk, in the order of 0.075 um, on a cushion of air (air bearing) which counterbalances the preloading, the air bearing being created by the rotating disk. The actuator then moves the load beam to position one or more sliders at desired concentric tracks on the disks for reading and writing by the magnetic heads. The slider is gimbal supported by the HGA as it flies with respect to the disk.

A high capacity magnetic disk drive employs a plurality of double sided magnetic disks in a disk stack assembly and a plurality of suspension systems in a head stack assembly. The suspension systems, which are supported by an actuator assembly, are interleaved between the disks so that each side of each disk can be read and written by a respective magnetic head. Sliders of top and bottom suspensions in the stack face top and bottom surfaces of top and bottom disks and sliders of each pair of suspension systems between the top and bottom suspensions face opposing surfaces of a respective pair of disks. The surface facing the disk is the ABS surface. The top and bottom suspension of one actuator arm are referred to as a suspension pair.

It has long been recognized that it is necessary to retract or move away a slider from a disk if there is insufficient angular velocity of the disk to maintain a flying relationship with the slider. If the slider is not retracted then there will be increased stationary frictional forces that must be overcome to move the slider relative to the disk. These forces are known in the art as "stictional" forces. Stiction must be eliminated in a high capacity magnetic disk drive for each slider that is part of a slider suspension pair. The difficulty of the task is exacerbated by the fact that one slider of the pair faces one surface of a first disk and the other slider of the pair faces in an opposite direction toward the surface of a second disk. U.S. Pat. No. 5,231,549 to Morehouse et al. describes one technique for retracting a slider from a disk in a disk drive having a plurality of disks arranged in a disk stack assembly. The '549 patent discloses an actuator arm that has a cam follower which moves along a cam surface placed along the side of the disk. The cam surface serves as a ramp for lifting a slider that is attached to a suspension that is itself attached to the arm. Similar unloading ramps are described in other patents issued to Morehouse et al., including U.S. Pat. Nos. 5,289,325, 5,237,472, and 4,933,785. The ramp or cam surface described in each of these patents fits in the space between disks and engages the cam follower on the suspension. The inventors of this invention have recognized that such an arrangement is problematic because disk spacing is something that is constantly being reduced in the development of storage systems as the number of disks required to be stacked in a high capacity disk drive continues to be increased. Consequently, the amount of space available for such a ramp is also decreased. As disk spacing decreases, such a ramp configuration will likely be rendered infeasible because there will not be sufficient space to fit the ramp. It is also recognized by the inventors of the present invention that the complication of having to move one slider attached to one suspension in one direction and the other suspension of a suspension pair in another direction will also make such a ramp configuration unworkable as space is reduced because a separate space-consuming ramp is required for each slider.

What is needed is the capability to move a slider away from a disk in a high capacity disk drive system without requiring any more space between the disks than is required to accommodate an actuator arm having a slider suspension pair.

SUMMARY OF THE INVENTION

To overcome the limitations in the prior art described above, and to overcome other limitations that will become apparent, this invention provides novel embodiments of cam surfaces attached to suspension pairs that are actuated by a finger inserted between the cams. Each cam surface is attached to a respective suspension and is oriented in such a way that the cams can fit between two disks within the space that is allocated between one body of a slider to the body of the other slider of the suspension pair. Since the finger used to actuate the cam fits between the surfaces no extra space is required to accommodate the finger. In a preferred configuration one finger accommodates one suspension pair and an array of stacked fingers is placed near the outer periphery of a disk stack to accommodate the multiple suspension pairs. In one embodiment the fingers are each separate pins set into a comb. In another embodiment each finger is an integral part of a one-piece comb and finger assembly. Other objects and advantages of this invention will be readily appreciated upon reading the following description in view of the accompanying drawings.

BRIEF DESCRIPTION OF THE DRAWING

FIG. 5A is a top isometric illustration of the actuator arm of FIG. 1 showing attached cams and pairs of suspensions;

FIG. 6A is an enlarged top isometric illustration of one suspension of the suspension pair shown in FIGS. 5A and 5B;

FIG. 6B is an isometric illustration of the suspension of FIG. 6A in an inverted position from that shown in FIG. 6A;

FIG. 8A is a side plan view of the suspension cams of FIGS. 5A and 5B not engaged by the cam actuation device;

FIG. 8B is a side plan view of the suspension cams of FIGS. 5A and 5B engaged by the cam actuation device of FIG. 8A.

DESCRIPTION OF THE PREFERRED EMBODIMENT

Figure 1:
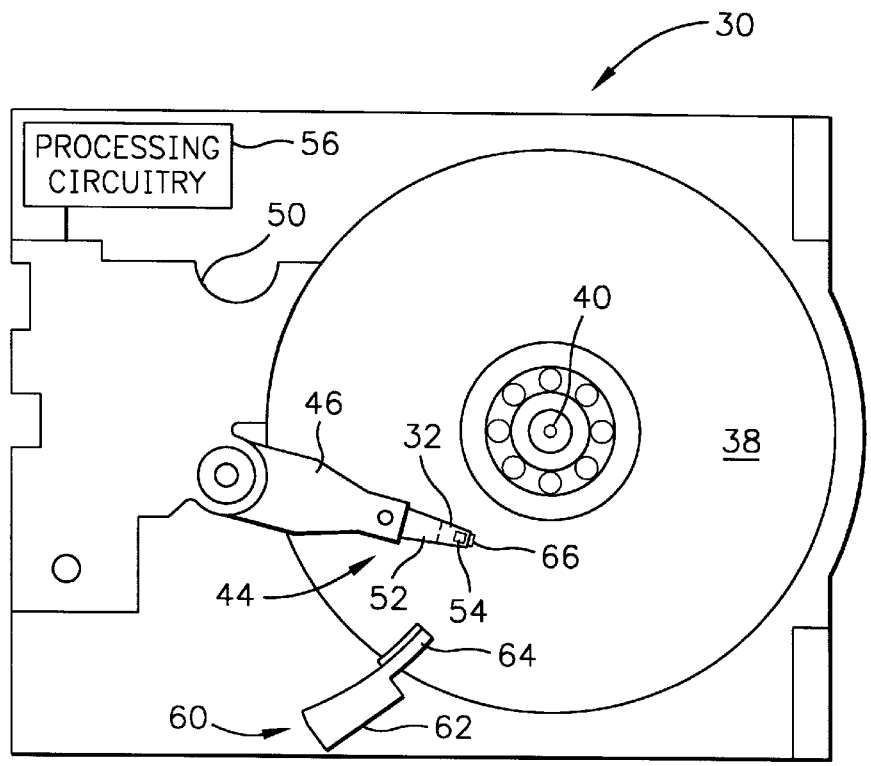
FIG. 1 is a top plan view of a magnetic disk drive having an actuator arm including a suspension retention and retraction system including a cam actuation device and a corresponding cam for each suspension.
Figure 2:
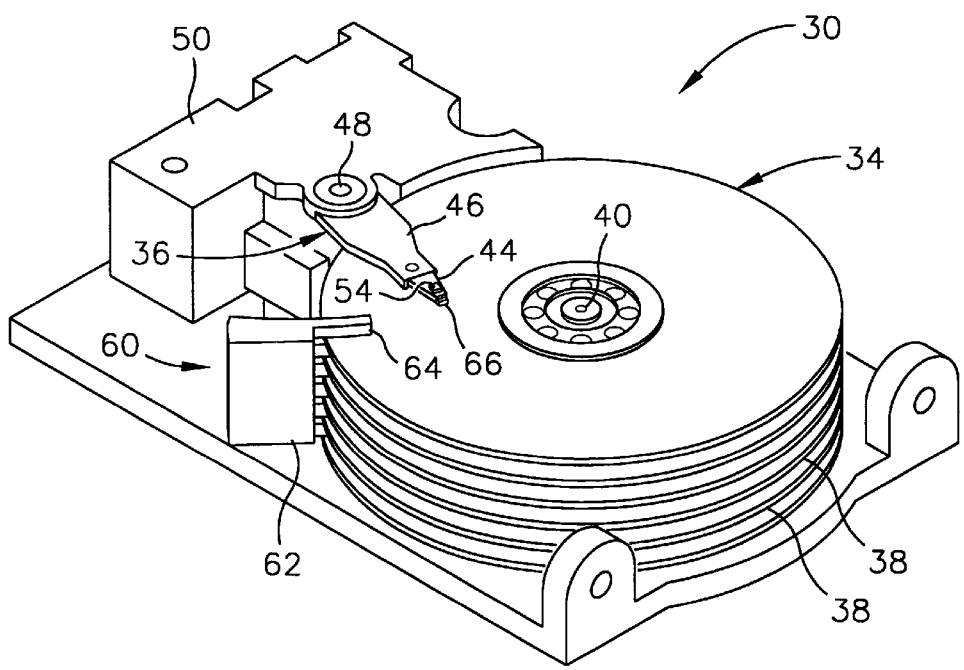
FIG. 2 is a top isometric illustration of the magnetic disk drive of FIG. 1.

Referring now to the drawings wherein like reference numerals designate like or similar parts throughout the several views, there is shown in FIGS. 1, 2 a high capacity magnetic disk drive 30 which employs a suspension 44 embodying this invention. The disk drive has a disk stack assembly 34 and a suspension stack assembly 36. The disk stack assembly 34 includes a plurality of vertically stacked disks 38 which are supported for rotation on a spindle 40, the spindle 40 being rotated by a motor (not shown). The suspension stack assembly 36 includes a plurality of vertically stacked suspensions 44, each suspension being mounted to a respective actuator arm 46. Each actuator arm 46 is mounted for rotation on an actuator hub 48 which is selectively rotated by a voice coil 50. Each suspension 44 includes a respective head gimbal assembly (HGA) 32 and a load beam 52, the HGA being mounted integrally on the load beam and forming a portion of a forward end of the load beam. The HGA acts as a flexure on the load beam imparting a spring-like capability to the suspension.

Figure 5B:
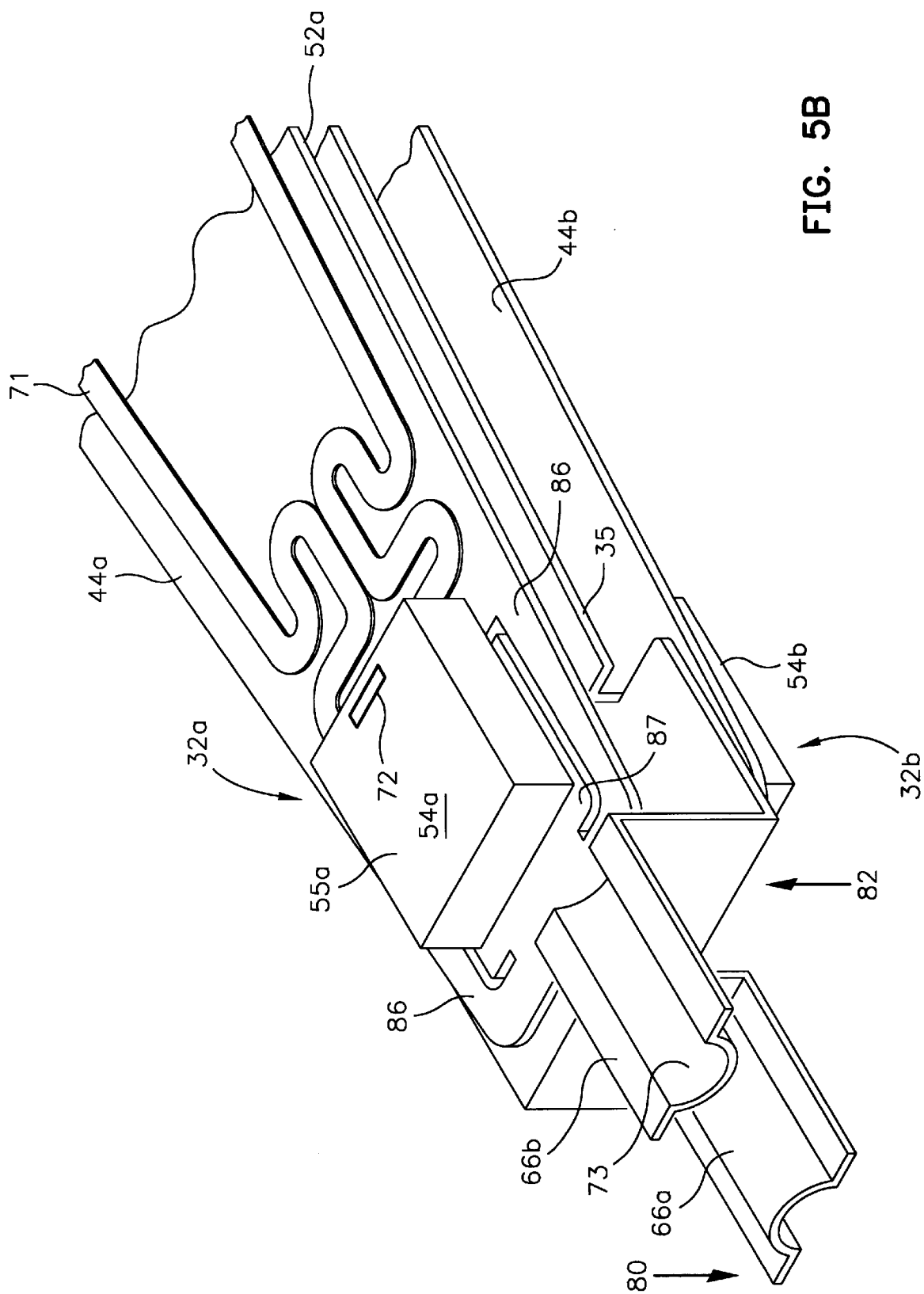
FIG. 5B is an enlarged top isometric illustration of the cams and suspension pairs of FIG. 5A.

Referring to FIGS. 1, 2, and 5B, each suspension, other than the one that serves the top surface of the top disk, and the one that serves the bottom surface of the bottom disk in disk stack assembly 34 has a mating suspension attached to the same actuator arm 46. The pair of mating suspensions are referred to as suspension pairs. Each HGA 32 includes a slider 54 mounted on tongue 87 which carries a read/write element 72 for reading and writing magnetic signals on the disks 38. Processing circuitry 56 is operatively connected to the motor 42, the voice coil 50, and the magnetic heads for rotating the disks 38, selectively rotating the actuator arms 46, and reading and writing on the disks respectively. When the voice coil 50 is operated, the magnetic heads on the slider 54 are moved to selected circular tracks on the disks where magnetic signals are read and written by the heads. Because of direct access to these circular tracks by simple rotation of the actuator arms 46, this type of storage device is known as a direct access storage device (DASD).

Each load beam 52 preloads a respective slider 54 on a surface of a disk 38. When the disks 38 are rotated, each disk creates a cushion of air called an air bearing which counterbalances preloading of the load beam 52 causing a slider to fly slightly off of the surface of a disk, in the order of 0.075 microns. The surface of the slider, which is supported by this air bearing, is known as an air bearing surface (ABS). In some embodiments, the surface of the disk 38 may be provided with a lubricant allowing the ABS of the slider to slightly contact the surface of the disk when the disks are rotated.

Stacking density of the disk stack assembly 34 increases the storage capacity of the disk drive 30. Accordingly, there is a strong felt need for reducing the spacing between the disks 38 as much as practical under the circumstances. It is necessary to lift the slider 54 away from the disk 38 when the slider is not flying in order to prevent stiction. In accordance with this objective, this invention is directed toward providing a way to provide retention and retraction of the suspension 44 within a small amount of spacing. Since the slider is attached to the suspension the inventor has recognized that the suspension's flexible spring-like configuration can be taken advantage of in order to move the slider.

Referring again to FIGS. 1 and 2, cam actuation device 60, including comb 62, and a plurality of fingers 64 protruding between the disk 38, is positioned at an outer periphery of the disk stack assembly 34. A finger 64 protrudes above the top disk on the stack and below the bottom disk in the stack; however, the significant savings in space accomplished by this invention occur between the disks. Therefore, this discussion concentrates primarily on the positioning of cam fingers between disks. A cam surface 66 is attached to each suspension 44 and is oriented in such a way that the cams fit within the disk spacing allocated between the body of one slider and the corresponding body of the mating slider of the suspension pair. Since the cam activating finger 64 fits between the two sliders, no significant extra space, in addition to that already consumed by the sliders, is required to accommodate the finger. This is an important advancement in the art because the thickness of the slider plus the thickness of the rest of the suspension must be provided for anyway. Even more significant is the fact that two cams can be provided for between two sliders without requiring extra space. In a preferred configuration, one finger actuates both suspensions of one suspension pair simultaneously, and an array of stacked fingers is placed near the outer periphery of disk stack 34 in order to accommodate the multiple suspension pairs. In one embodiment, which will be described in detail below, each finger is an integral part of a one-piece cam actuation device, and in another each finger is a separate pin placed in a comb.

Figure 3:
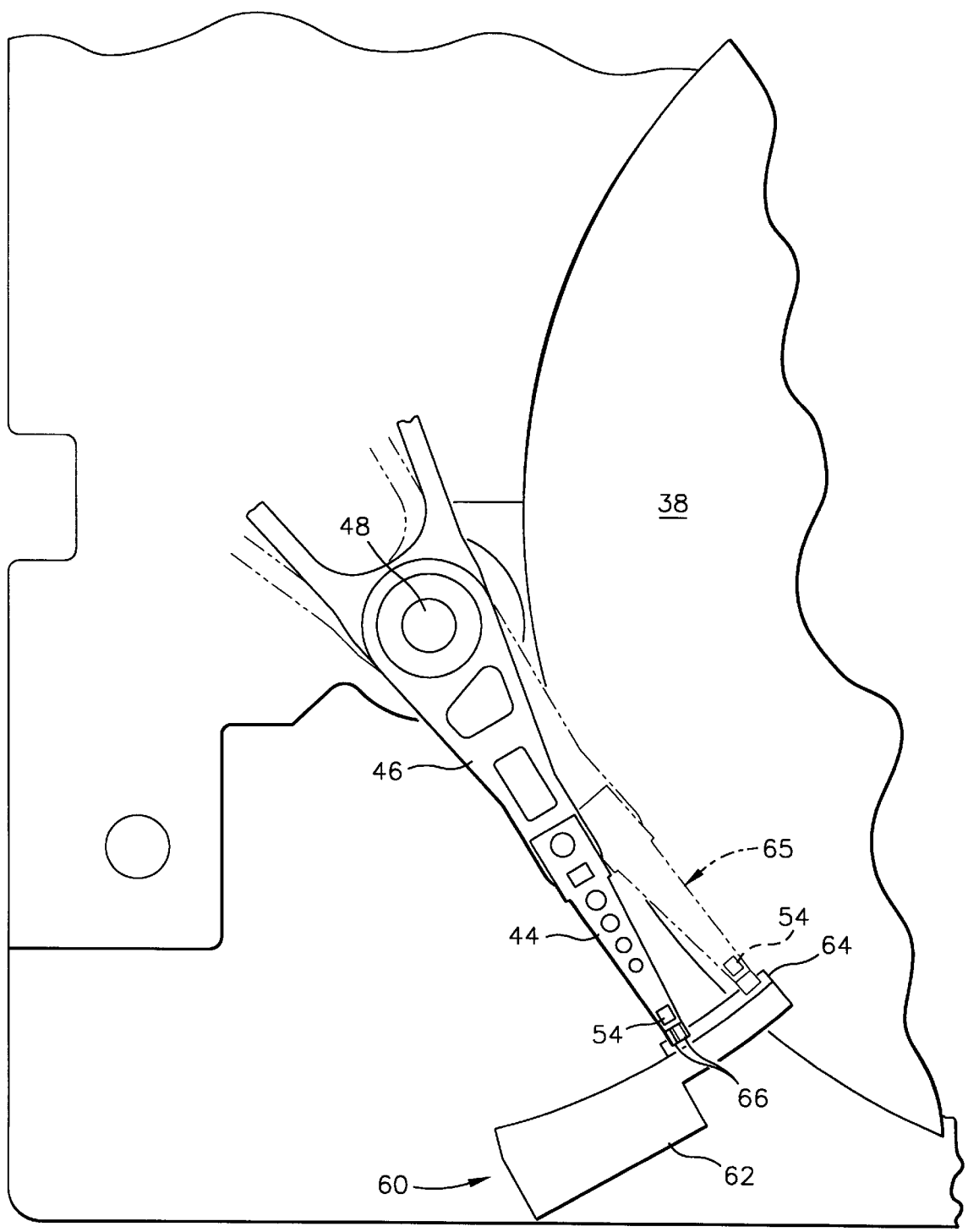
FIG. 3 is an enlarged top plan view showing a portion of the magnetic disk drive of FIG. 1.

FIG. 3 shows an enlarged top plan view of a portion of the magnetic disk drive described above with reference to FIG. 1. Under control of the voice coil 50, the actuator arm 46 rotates around actuator hub 48. The suspension 44, which is attached to the arm, also rotates with arm 46 causing it to move across the surface of disk 38. When the disk 38 is not spinning then it is not possible to maintain a flying relationship of the slider 54 above the disk. Therefore, to prevent stiction it is necessary to pull the suspension 44 and slider 54 away from the disk. In one preferred embodiment of this invention, this is accomplished by moving suspension 44 to the outer periphery of disk 38. At the edge of disk stack 34 is the finger 64 which is attached to comb 62 of the cam actuation device 60. The cam surface 66 is actuated or pushed by the finger 64 causing it to move up or down and therefore the slider is pulled away from disk 38. A phantom view 65 in FIG. 3 shows the rotational movement of suspension 48, cam surface 66*a* and attached suspension 44*a* caused by rotation of the actuator arm.

Figure 4:
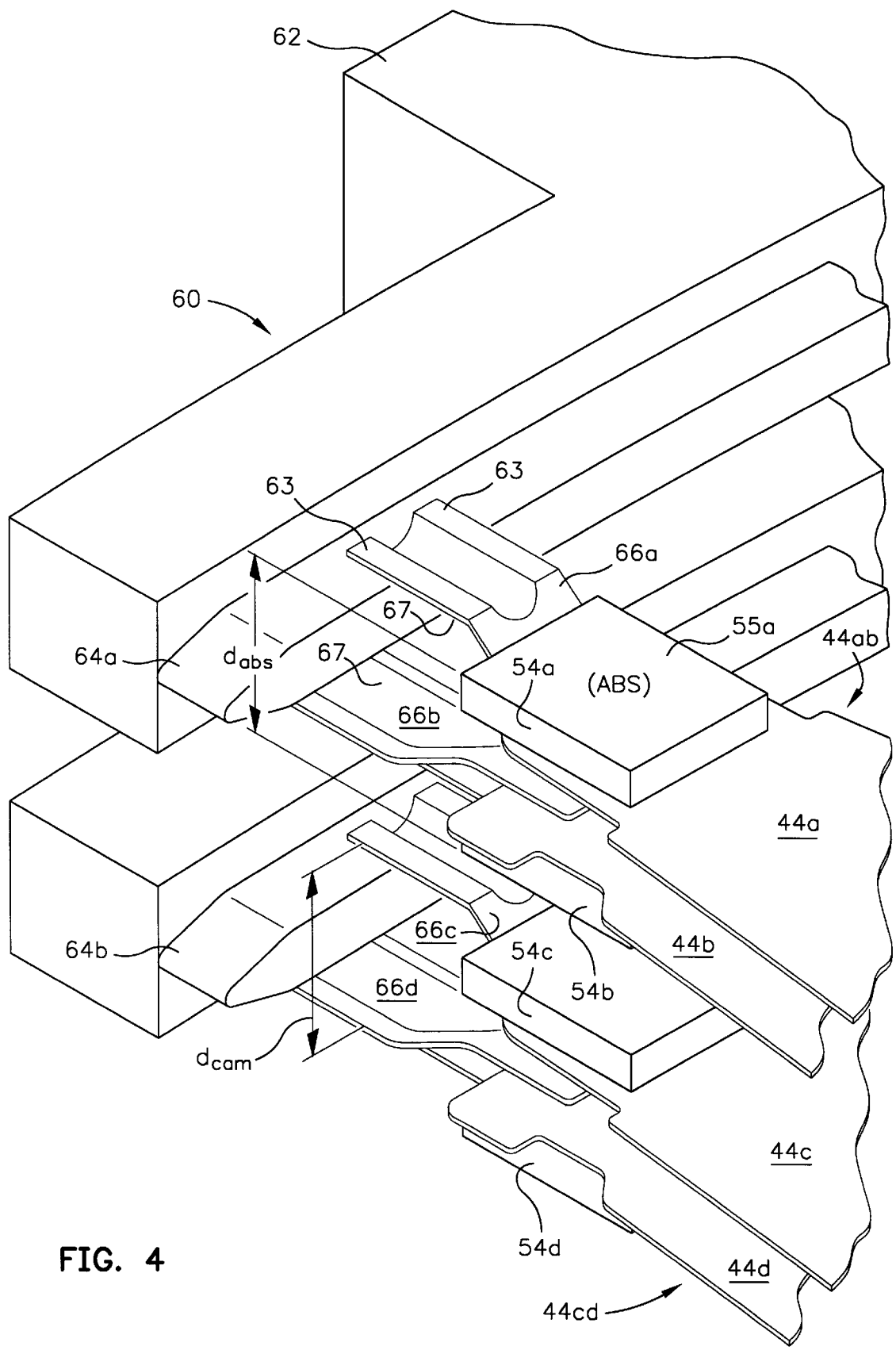
FIG. 4 is an enlarged top isometric view of one embodiment of the cam actuation device and the cams of FIG. 1.

Slider 54*a* is attached to suspension 44*a* and includes a read/write element for reading or writing to disk 38. Suspension 44*a* is part of suspension pair 44*a*/44*b* and its suspension mate is suspension 44*b* which is disposed opposite suspension 44*a*. Both suspensions are attached to the same actuator arm. Slider 54*a* faces the bottom surface of a disk. The disk is not shown in FIG. 3 for the sake of simplicity. Slider 54*b* faces in an opposite direction so that the head can read and write the magnetic surface of another disk 38 whose top surface is disposed in a magnetic transducing relationship to the slider. The spacing between each of disks 38 must be sufficient to accommodate the sliders 54*a* and 54*b*. It will be appreciated that the ABS surface 55*a* of slider 54*a* and the ABS surface 55*b* of slider 54*b* provides planes spaced apart by a distance $d_{abs}$. The inventor has made the critical recognition that the distance $d_{abs}$ must always be provided for in a magnetic disk drive having a slider and therefore the distance $d_{abs}$ will always be available for a retention and retraction device. Having made this critical recognition, the inventor of this invention has provided mating cam pairs, such as cam 66*a* and 66*b*, which fit on the suspension within that distance. With reference to FIG. 4, it will be appreciated that the distance $d_{cam}$ from a plane formed by the rails 63 of cam 66*a* and a plane formed by the bottom surface 67 of cam 66*b* is at least significantly less than $d_{abs}$. In fact, the distance consumed by the span of $d_{cam}$ is even smaller than $d_{abs}$, because the span fits in the gap between sliders 54*a* and 54*b* in the suspension pair. This relationship is achievable because the cams are, in effect, placed between the slider pairs. The details of the positioning of cam to each load beam supporting each slider will be discussed below with reference to FIGS. 5A & 5B.

Figure 9:
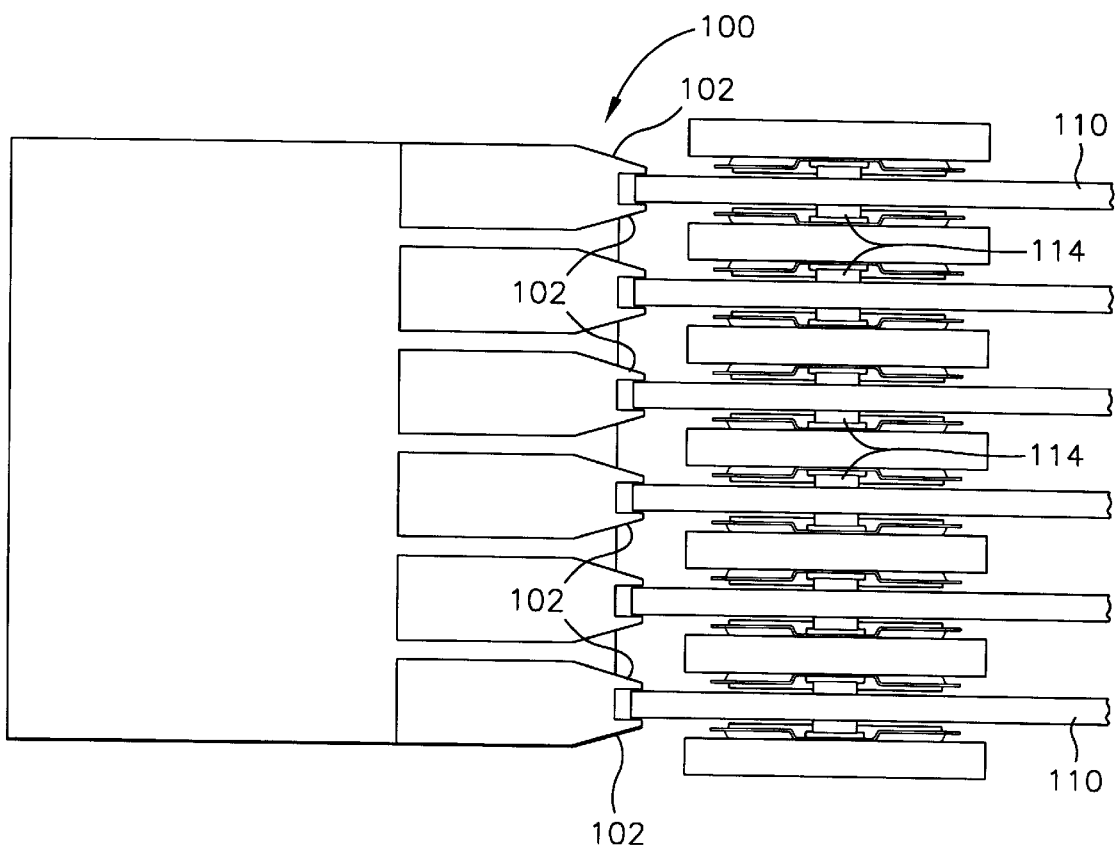
FIG. 9 is a schematic illustration showing an operating relationship between a prior art camp configuration and a prior art slider suspension.

The importance of the spacing relationship can best be appreciated by referring to a typical prior art ramp configuration 100 shown in FIG. 9. It will be appreciated that in this prior art configuration there is a requirement to accommodate a separate ramp 102 for each suspension of a suspension pair. In such a case the distance between the disks 110 that is required for the ramp exceeds the space allocated between the sliders 114. It should be apparent that such a prior art ramp configuration requires significantly more space than that required by the apparatus of this invention.

It shall be appreciated that in a high capacity disk drive having multiple disks there will be multiple suspension pairs and there must be one finger, such as finger 64*a*, for each pair of cam surfaces belonging to the suspension pair. In addition to the members of suspension pair 44*a*/44*b*, each other suspension pair must be actuated by a finger. For example, the suspension pair 44*c*/44*d* comprises slider suspension 44*c* and 44*d* having respectively cams 66*c* and 66*d* which are actuated by finger 64*b* of cam actuation device 60.

FIGS. 5A and 5B each show an enlarged isometric illustration of suspension 44. In FIG. 5A the suspension is shown attached to actuator arm 46. Cams 66*a* and 66*b* can be seen attached respectively to the suspension 44*a* and the suspension 44*b* of slider suspension pair 44*a*/44*b*. Each cam is preferably configured to have a U-shaped channel 73 disposed between rails 63. Electrical leads 71 provide a data path that carries data to and from slider 54*a* in which a read/write element 72 is housed. Slider 54*a* includes the read/write element, the combination forming that what which is referred to as a read/write head. Cam 66*b* is attached to suspension 44*b* and cam 66*a* is attached to suspension 44*a*.

FIG. 5B shows a larger view of a portion of the suspension 44*a* including head gimbal assembly (HGA) 32. For each suspension in a suspension pair there is an HGA, therefore there is an HGA 32*a* and HGA 32*b* for suspensions 44*a* and 44*b* respectively. The tongue 87 of the HGA, in effect, pivots on a load dome (not shown), as is well-known in the art. Preferably, the load dome should be included as part of a stiffener portion 35 of the cam assembly. A suspension stiffener 35 attached to the cam fits under the HGA portion of the load beam. HGA 32*a* includes slider 54*a* which carries the read/write element 72 for reading and writing magnetic signals on the disk 38 and HGA 32*b* includes slider 54*b* which also carries a read/write element. Suspension 44*a* includes load beam 52*a* to which cam 66*a* is attached. Suspension 44*b* includes an identical load beam to which cam 66*b* is attached.

Generally, the rotation of arm 46 moves cam 66*a* into a position to be engaged by finger 64*a*. When finger 64*a* engages the cam 66*a*, the cam is moved downward in direction 80. The finger also engages cam 66*b* at the same time. This causes cam 66*b* to move upward in direction 82. The movement of each cam 66*a* tends to move the slider attached to the same suspension and away from the facing surface of disk 38.

The slider 54*a* is positioned in a cantilevered position away from the flexure arms 86 and is positioned on tongue 87 of HGA 32*a*. Moving load beam 52*a* away from the disk also tends to pull the ABS 55*a* away from the disk. In a similar fashion, when the cam 66*b* is pushed upward in direction 82, then the slider 54*b* is moved upward and its ABS surface is also pulled away from the bottom surface of a disk 38. The geometric relationship of the cam to the other parts of the suspension will be further appreciated with reference to the drawing figures described below.

FIGS. 6A and 6B show a suspension 44*a*, which is identical to each other suspension positioned to allow reading and writing of data in the disk drive 30. FIGS. 6A and 6B show the suspension in respective positions that are each inverted from the other. The cam 66*a* can be seen attached to load beam 52*a* and includes rails 63. A bottom surface 67 formed by channel 73*a* is disposed between the rails 63. It is the bottom curved surface 67 of the U-shaped channel 73*a* that is engaged by finger 64 to actuate movement of the cam. FIG. 6B shows suspension 44*a* in an inverted position and in which the slider 54*a* having ABS surface 55*a* is positioned on the tongue of HGA 32*a* of suspension 44*a*. The relationship of curved surface 67 to slider 54*a* is such that when cam 66*a* is moved downward in direction 80 as described above, then slider 54*a* and ABS surface 55*a* will move away from the disk surface that each faces.

Rails 81 attached to the cam and attached to load beam 52*a* serve to strengthen the suspension. A channel 83 disposed between the rails is preferably configured with a well-known load dome on the side of the channel that is closest to the slider to allow the slider to pivot or rock on that point.

Figure 7A:
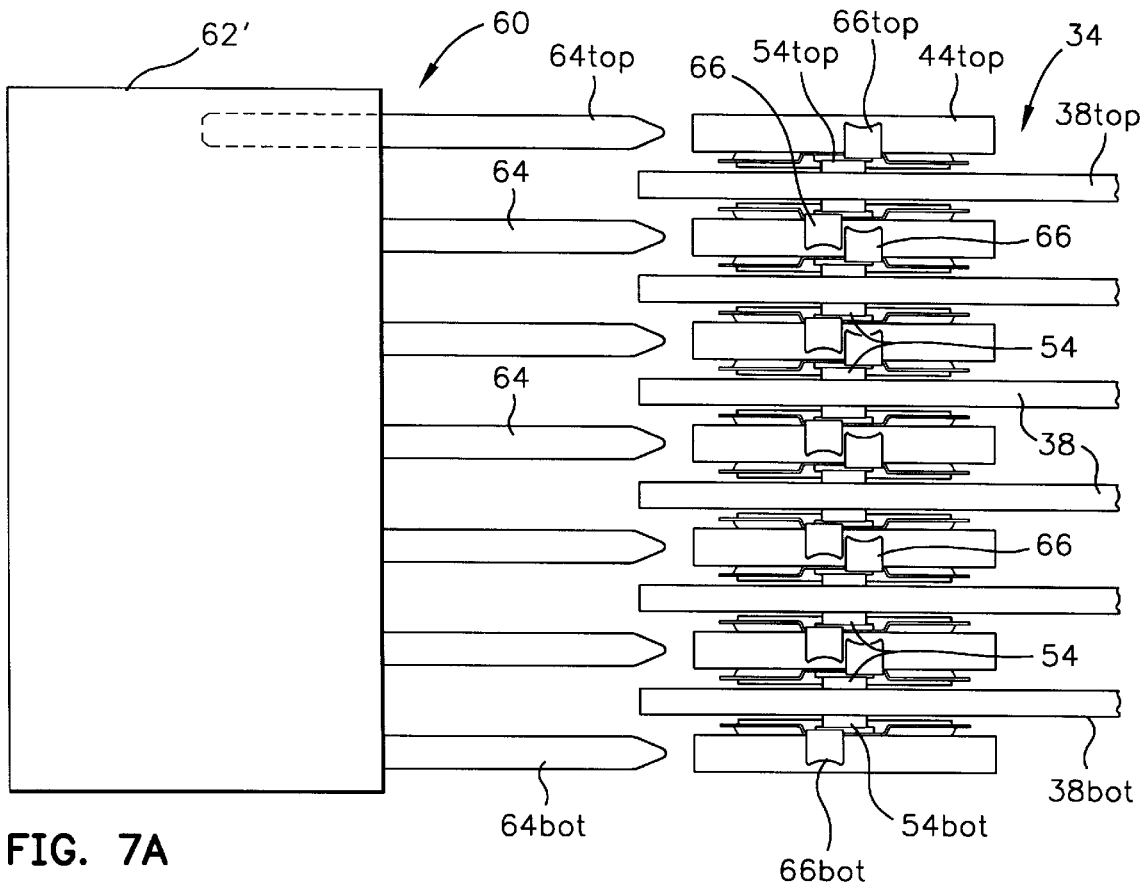
FIG. 7A is a schematic illustration showing an operating relationship among one embodiment of the cam actuation device, the cam surfaces of FIG. 1, and the disk drive of FIG. 1.
Figure 7B:
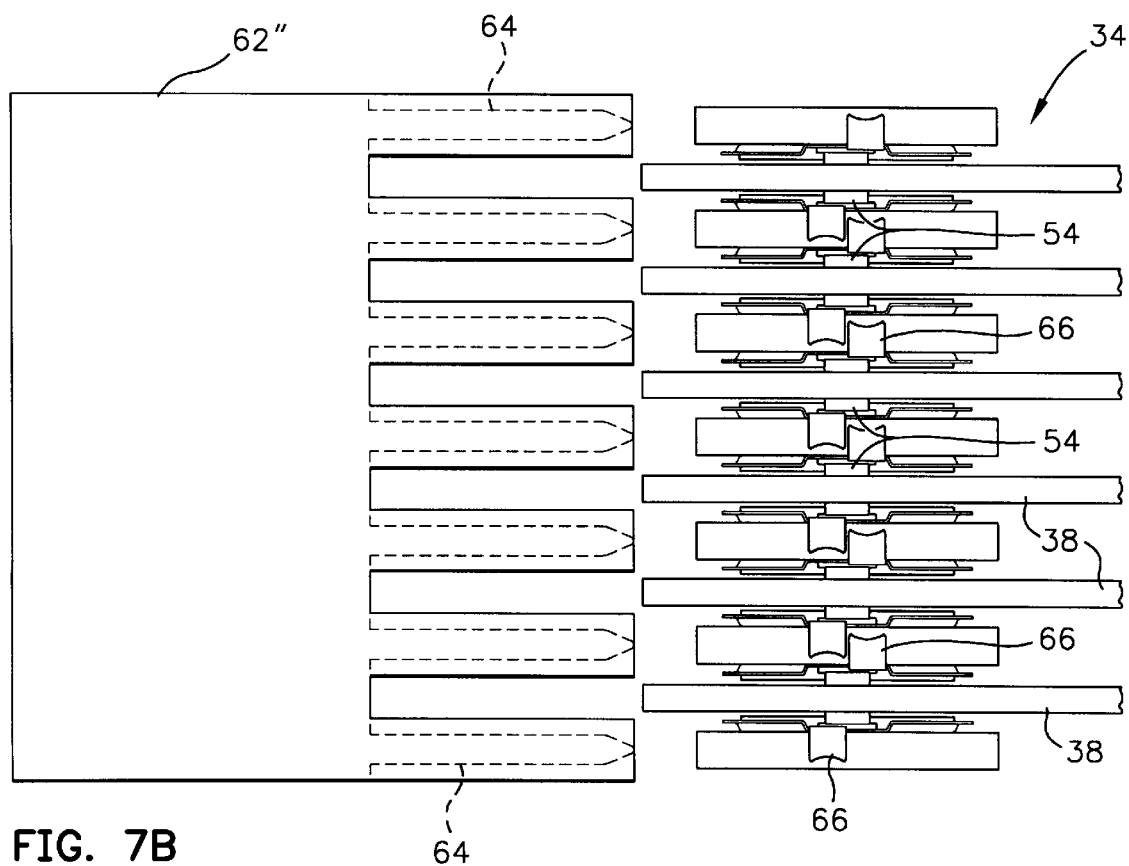
FIG. 7B is a schematic illustration showing an operating relationship among another embodiment of the cam actuating device, the cam surfaces of FIG. 1, and the disk drive of FIG. 1.

FIGS. 7A and 7B each show a schematic illustration of the operation of the cam actuation device with each cam pair that is attached to each suspension pair. The device and suspensions are shown in an operating arrangement with the disk stack 34 in each of these Figures. It should be noted that there will be one suspension which is not paired, since by necessity there will be one top disk 38top and one bottom disk 38bot, as shown in FIG. 7A. For example, suspension 44top with attached cam 66top will be engaged by finger 64top, thus moving slider 54top away from disk 38top. It can be appreciated without the necessity of explaining that the same relationship exists with cam 66bot and finger 64bot to disk 38bot.

FIG. 7A shows one embodiment of the cam actuation device where the fingers are integrally attached to the comb 62'. When each suspension is rotated by actuator arm into a position at the outer periphery of the disk stack that engages each finger 64, then each respective suspension will be moved in a respective upward and downward direction, as described above with reference to FIGS. 5A–5B and 6A–6B. FIG. 7B shows another embodiment of the cam actuation device 60 wherein the fingers 62 are configured as pins that are each placed into a comb 62" that is made separately from the fingers. The embodiment shown in FIG. 7B has the same relationship with the suspension and cams as the embodiment shown in FIG. 7A. The only difference is how the cam actuation device is made. The integral embodiment shown in FIG. 7A is all formed at one time in one mold cavity, while the embodiment shown in FIG. 7B requires the pins to be added to an already formed comb. It is a choice of manufacturing processes that is provided by the two different embodiments.

FIGS. 8A and 8B show the engaging relationship of the finger with a pair of cams. FIG. 8A shows an enlarged side plan view of the fingers, suspensions with cams, and disks. The finger 64 is shown in a stationary position placed between disks 38a and 38b. The suspensions 44a and 44b are shown with respective sliders 54a and 54b loaded very close to the disk because cams 66a and 66b, respectively, are not engaged by finger 64. With a proper lubricant each slider could actually be placed in contact with the disk. In FIG. 8B an engaged and actuating relationship is shown wherein cam 66a is pushed downward in direction 80 by finger 64 as actuator arm 46 is rotated to the outer periphery of the disk stack 34. Similarly, cam 66b is moved upward in direction 82, moving slider 54b away from the disk surface of disk 38b. The movement of the cams causes the flexure of the suspension to flex and thereby move the slider away from the disk. Thus, the inventors have taken advantage of the elasticity of the suspension by placing the cams at each end of respective load beams.

While various configurations and embodiments of a slider and suspension retention and retraction system for a high capacity disk drive have been described above, variations may occur to those skilled in the art in view of these teachings, therefore this invention is not to be limited in spirit or scope except in accordance with the spirit of the appended claims and their equivalents.

I claim:

1. A disk drive, having a plurality of disks, including:
   at least one pair of suspensions, each suspension having a load beam, a first slider mounted on a load beam of a first suspension of the pair of suspensions to face a surface of a first disk of the plurality of disks, a second slider mounted on the load beam of a second suspension of the pair of suspensions to face a surface of a second disk of the plurality of disks;
   a cam disposed at the front end of each load beam outside of the slider, between the slider and the front end;
   a cam actuation device having at least one finger positioned to concurrently actuate two cams on the pair of suspensions, thereby urging the first slider to move away from the surface of the first disk and the second slider to move away from the surface of the second disk in response to actuation of the cams by the finger, wherein the first and second sliders of the respective at least one pair of suspensions are aligned in a direction parallel to an axis of disk rotation and the cams of the respective pair of suspensions are laterally offset from each other along a direction substantially perpendicular to the direction parallel to the axis of disk rotation.

2. The disk drive of claim 1, wherein each load beam includes a flexure, each flexure having a top surface, each slider being associated with a flexure and mounted to the top surface of the associated flexure.

3. The disk drive of claim 2 further comprising:
   a read/write element mounted on each slider; and
   a data path connected to each read/write element for coupling read and write signals to and from each disk.

4. The disk drive of claim 1, wherein the cam is offset from a plane defined by the bottom surface of the load beam.

5. The disk drive of claim 1, wherein the cam includes a substantially U-shaped channel having a curved outside surface that forms a cam actuating surface.

6. The disk drive of claim 1, wherein the cam is configured to be actuated by the finger when the suspension is positioned near the outer periphery of one of the disks within the disk drive.

7. The disk drive of claim 1, wherein the suspension pair is arranged with a first suspension of the suspension pair in an inverse position with respect to a second suspension of the suspension pair.

8. The disk drive of claim 1 further including at least two disks, and wherein the suspension pair and the finger are each placed between two of the at least two disks.

9. A disk drive, including;
   a disk stack assembly including a plurality of disks, each disk having a surface configured to have information disposed thereon and being arranged in a parallel stacked relationship with each other disk and the plurality of disks being rotatable on a supporting spindle;
   a plurality of suspension pairs, each suspension pair comprising a first and second suspension, each suspension having a load beam, a first slider mounted on a load beam of the first suspension of the pair of suspensions to face a surface of a first disk of the plurality of disks, a second slider mounted on the load beam of the second suspension of the pair of suspensions to face a surface of a second disk of the plurality of disks;
   a cam disposed at the front end of each load beam outside of the slider, between the slider and the front end;
   a plurality of fingers, at least one finger corresponding to one of the plurality of suspension pairs in position to concurrently actuate at least two cams of the corresponding suspension pair, thereby urging the sliders disposed on each load beam to move in response to actuation of the cams; and
   a suspension stack assembly which includes the plurality of suspension pairs, each suspension arranged in a stacked parallel relationship with the other suspension of the pair, and each pair wherein the first and second sliders of a respective pair of suspensions are aligned in a direction parallel to an axis of disk rotation and the cams of the respective pair of suspensions are laterally offset from each other along a direction substantially perpendicular to the direction parallel to the axis of disk rotation arranged in a stacked parallel relationship with each other pair.

10. The disk drive of claim 9, further including an actuator hub having a plurality of actuator arms, each arm arranged in a stacked parallel relationship with each other arm, each suspension of the suspension stack assembly being mounted on a respective actuator arm of the plurality of actuator arms.

11. The disk drive of claim 9, further comprising:

a cam actuation device stack assembly including a plurality of fingers, each finger arranged in a parallel stacked relationship with each other finger of the cam actuation device stack assembly, wherein there is a corresponding finger for each suspension pair and each corresponding finger is positioned so that when the suspension stack assembly is positioned at the outer periphery of the disk stack assembly each corresponding finger actuates a first cam and a second cam of the same suspension pair.

12. The disk drive of claim 9, wherein each load beam includes a flexure, the flexure has a top surface, and one of the sliders is mounted to the top surface of the flexure.

13. The disk drive of claim 9, further comprising:

a read/write element mounted on each slider; and a data path connected to each read/write element for coupling read and write signals to and from each disk.

14. The disk drive of claim 9, wherein each cam is offset from a plane defined by the bottom surface of the load beam on which the cam is disposed.

15. The disk drive of claim 9, wherein each cam includes a substantially U-shaped channel having a curved outside surface that forms a cam actuating surface.

16. The disk drive of claim 9, wherein each suspension pair is arranged with a first suspension of the suspension pair in an inverse position with respect to a second suspension of the suspension pair.

* * * * *